(12) United States Patent
Chen

(10) Patent No.: US 10,619,990 B2
(45) Date of Patent: Apr. 14, 2020

(54) TAILOR CUTTING ASSEMBLY WITH ANTI-SLIP FUNCTION AND TAILOR RULER THEROF

(71) Applicant: Chi-Jen Chen, Xihu Township, Changhua County (TW)

(72) Inventor: Chi-Jen Chen, Xihu Township, Changhua County (TW)

( * ) Notice: Subject to any disclaimer, the term of this patent is extended or adjusted under 35 U.S.C. 154(b) by 143 days.

(21) Appl. No.: 15/862,116

(22) Filed: Jan. 4, 2018

(65) Prior Publication Data

US 2019/0204057 A1 Jul. 4, 2019

(51) Int. Cl.

| | |
|---|---|
| *G01B 3/10* | (2020.01) |
| *G01B 3/04* | (2006.01) |
| *G01B 3/1061* | (2020.01) |
| *A41H 1/00* | (2006.01) |
| *G01B 5/00* | (2006.01) |
| *G01B 5/02* | (2006.01) |
| *G01B 1/00* | (2006.01) |
| *A41H 3/00* | (2006.01) |

(52) U.S. Cl.
CPC ............ *G01B 3/1061* (2013.01); *A41H 1/00* (2013.01); *A41H 3/005* (2013.01); *G01B 1/00* (2013.01); *G01B 3/04* (2013.01); *G01B 5/0002* (2013.01); *G01B 5/02* (2013.01)

(58) Field of Classification Search
CPC .......... A41H 1/00; G01B 1/00; G01B 3/1061; G01B 5/0002; G01B 5/02
USPC .................................................. 33/492, 494
See application file for complete search history.

(56) References Cited

U.S. PATENT DOCUMENTS

| | | | | | |
|---|---|---|---|---|---|
| 4,779,346 | A | * | 10/1988 | Schafer | ..................... B43L 7/00 33/1 B |
| 5,557,996 | A | * | 9/1996 | Reber | ..................... B25H 7/02 30/292 |
| 5,819,422 | A | * | 10/1998 | Schafer | ................. D05B 97/12 33/1 B |
| 6,158,135 | A | * | 12/2000 | Rank | ........................ B43L 7/00 33/1 B |
| 6,311,408 | B1 | * | 11/2001 | Madayag | ............... A41D 27/20 33/1 G |
| 6,729,035 | B1 | * | 5/2004 | Carrillo | ............... E04F 21/0076 33/526 |
| 6,925,724 | B2 | * | 8/2005 | Tandy | ................... D05B 97/12 33/563 |

(Continued)

*Primary Examiner* — Yaritza Guadalupe-McCall
(74) *Attorney, Agent, or Firm* — Egbert Law Offices, PLLC

(57) ABSTRACT

A tailor ruler includes a transparent substrate includes a series of scales, a series of parallel lines and a series of longitudinal lines respectively formed thereon, wherein the series of parallel lines and the series of longitudinal lines respectively perpendicularly correspond to one another. Each of the parallel lines and the longitudinal lines respectively has a series of reference lines formed thereof. Each intersection of the parallel lines and the longitudinal lines is formed with an identifying point. An anti-slip layer is disposed on the back surface of the transparent substrate, wherein the anti-slip layer is disposed along an edge of the transparent substrate. The anti-slip layer contains countless sharp particles, wherein the sharp particles are partially exposed relative to a surface of the anti-slip layer for promoting a fraction force of the anti-slip layer and enhancing an anti-slip effect of the tailor ruler.

20 Claims, 5 Drawing Sheets

(56) References Cited

U.S. PATENT DOCUMENTS

| | | | | |
|---|---|---|---|---|
| 7,043,850 B2* | 5/2006 | Brady | ............... | G01B 3/002 33/11 |
| 7,100,295 B1* | 9/2006 | Chang | ............... | B43L 7/027 33/1 B |
| 7,185,441 B2* | 3/2007 | Lockyer | ............... | B26B 29/06 33/562 |
| 7,509,745 B2* | 3/2009 | Schafer | ............... | B26B 29/06 33/1 B |
| 8,011,111 B2* | 9/2011 | Brady | ............... | G01B 3/004 33/494 |
| 8,087,179 B1* | 1/2012 | Gomez | ............... | G09B 29/00 33/1 G |
| 8,186,073 B2* | 5/2012 | Nethery | ............... | B43L 7/005 33/562 |
| 8,904,661 B1* | 12/2014 | Norgard | ............... | G01B 3/04 33/1 B |
| 2003/0110653 A1* | 6/2003 | Schafer | ............... | B26B 29/06 33/562 |
| 2004/0049935 A1* | 3/2004 | Tandy | ............... | D05B 97/12 33/563 |
| 2004/0088870 A1* | 5/2004 | Schafer | ............... | B26B 29/06 33/1 B |
| 2004/0163269 A1* | 8/2004 | Brady | ............... | G01B 3/002 33/562 |
| 2005/0178013 A1* | 8/2005 | Schafer | ............... | B26B 29/06 33/1 B |
| 2006/0283026 A1* | 12/2006 | Lockyer | ............... | B26B 29/06 33/1 B |
| 2007/0175052 A1* | 8/2007 | Schafer | ............... | B26B 29/06 33/1 B |
| 2009/0025245 A1* | 1/2009 | Brady | ............... | B26B 29/06 33/562 |
| 2009/0158602 A1* | 6/2009 | Lockyer | ............... | B43L 7/005 33/1 B |
| 2010/0223798 A1* | 9/2010 | Zimmerman | ............... | B43L 7/027 33/494 |
| 2011/0010955 A1* | 1/2011 | Zaremski | ............... | B24B 3/46 33/492 |
| 2012/0102771 A1* | 5/2012 | Nethery | ............... | B43L 7/005 33/565 |
| 2015/0000146 A1* | 1/2015 | Chang | ............... | D05B 97/12 33/493 |
| 2018/0001498 A1* | 1/2018 | Oey | ............... | G01B 1/00 |
| 2019/0204057 A1* | 7/2019 | Chen | ............... | G01B 3/1061 |

* cited by examiner

TAILOR CUTTING ASSEMBLY WITH ANTI-SLIP FUNCTION AND TAILOR RULER THEROF

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a tailor cutting assembly, and more particularly to a tailor cutting assembly with anti-slip function and tailor ruler thereof.

2. Description of Related Art Including Information Disclosed Under 37 CFR 1.97 and 37 CFR 1.98

As is well known, to easily identify and set a distance when cutting cloth, a conventional tailor ruler provides the functions of guiding to draw an angled line, measuring angles, setting distance and equally dividing parts. In addition, some tailor ruler manufacturers provide an anti-slip structure on a back of the tailor ruler to prevent the abut tailor and cloth from an offset condition because the tailor ruler is directly pressed on the cloth during cutting. The anti-slip structure is provided along the edge of the tailor ruler. The vertical lines and the horizontal lines on the tailor ruler forms a checkerboard. Consequently, the conventional anti-slip structure needs a lot of anti-slip material, but provides poor anti-slip function. As a result, the anti-slip is wasted and the cost of the conventional tailor ruler is imperceptibly raised.

In addition, the conventional anti-slip material usually is UV (Ultraviolet Rays) glue. As the name suggests, the UV glue needs to be illuminated by UV ray when being hardened such that the costs of material and manufacturing is high. The hardened UV includes the advantages of wear resistance, solvent resistance and impact resilience and has a high strength, however, the hardened UV glue provides a poor anti-slip function to the conventional tailor ruler.

The present invention has arisen to mitigate and/or obviate the disadvantages of the conventional tailor ruler.

BRIEF SUMMARY OF THE INVENTION

The main objective of the present invention is to provide an improved tailor cutting assembly and tailor ruler thereof that use sharp particles to promoted friction force thereof.

To achieve the objective, the tailor ruler in accordance with the present invention comprises a transparent substrate having a front surface and a back surface. The transparent substrate includes a series of scales peripherally formed on the front surface thereof, a series of parallel lines formed on the front surface thereof and a series of longitudinal lines formed on the front surface thereof, wherein the series of parallel lines and the series of longitudinal lines respectively perpendicularly correspond to one another. Each of the parallel lines and the longitudinal lines respectively has a series of reference lines formed thereof. Each intersection of the parallel lines and the longitudinal lines is formed with an identifying point. An anti-slip layer is disposed on the back surface of the transparent substrate, wherein the anti-slip layer is disposed along an edge of the transparent substrate. The material of the anti-slip layer is selected from a group consisted of thermoplastic polyurethane (TPU), rubber printing ink and silicone. The anti-slip layer contains countless sharp particles, wherein the sharp particles are partially exposed relative to a surface of the anti-slip layer for promoting a fraction force of the anti-slip layer and enhancing an anti-slip effect of the tailor ruler.

Further benefits and advantages of the present invention will become apparent after a careful reading of the detailed description with appropriate reference to the accompanying drawings.

DETAILED DESCRIPTION OF THE INVENTION

Figure 1:
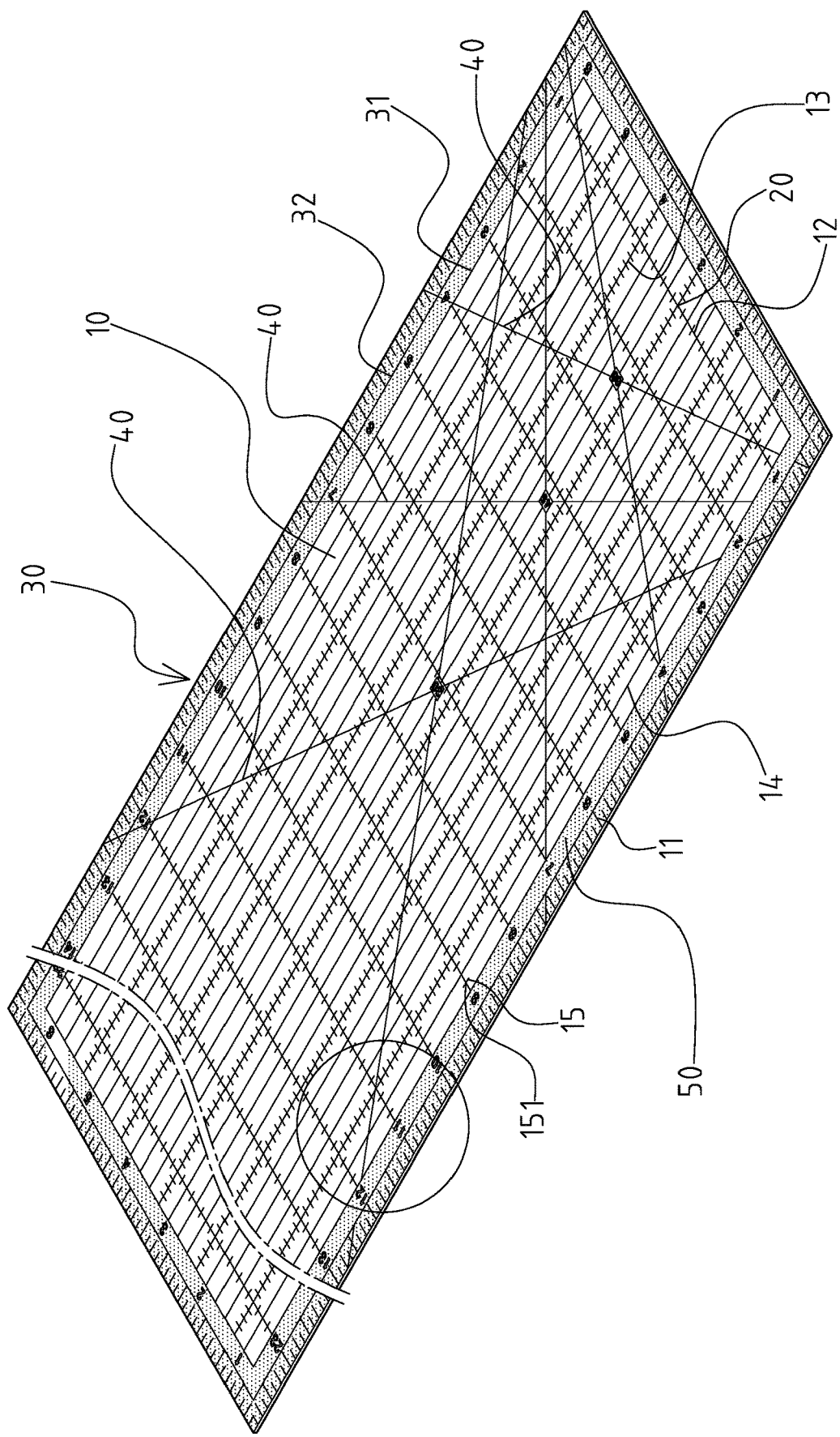
FIG. 1 is a perspective view of a tailor ruler in accordance with the present invention.
Figure 2:
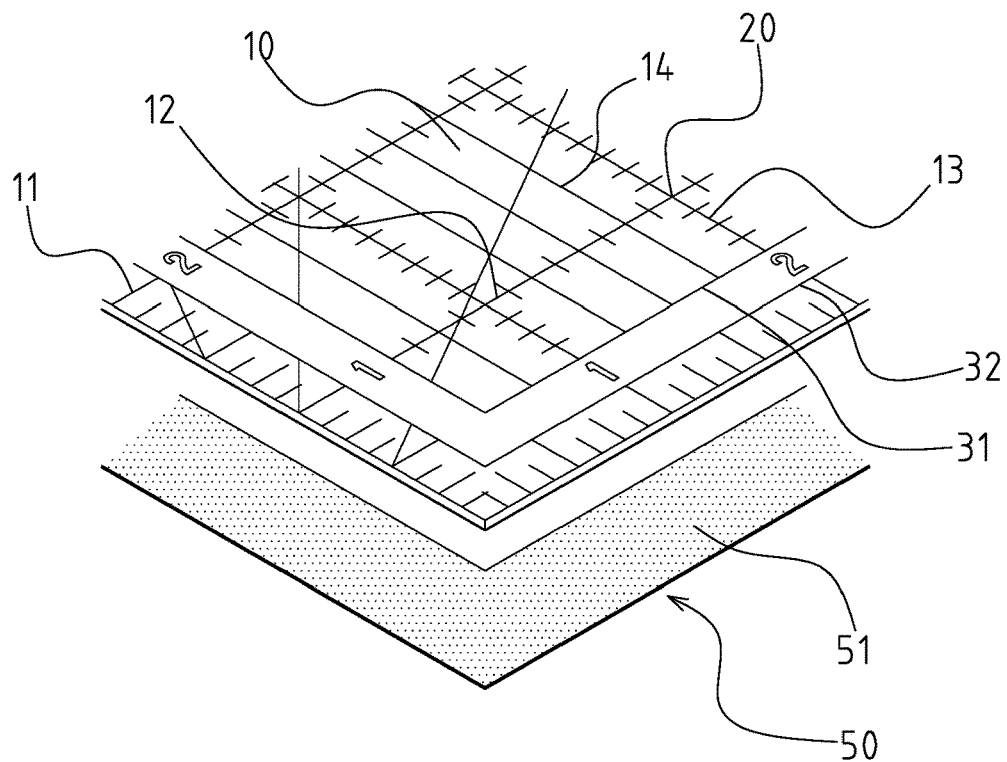
FIG. 2 is a partially exploded perspective view of the tailor ruler in accordance with the present invention.
Figure 3:
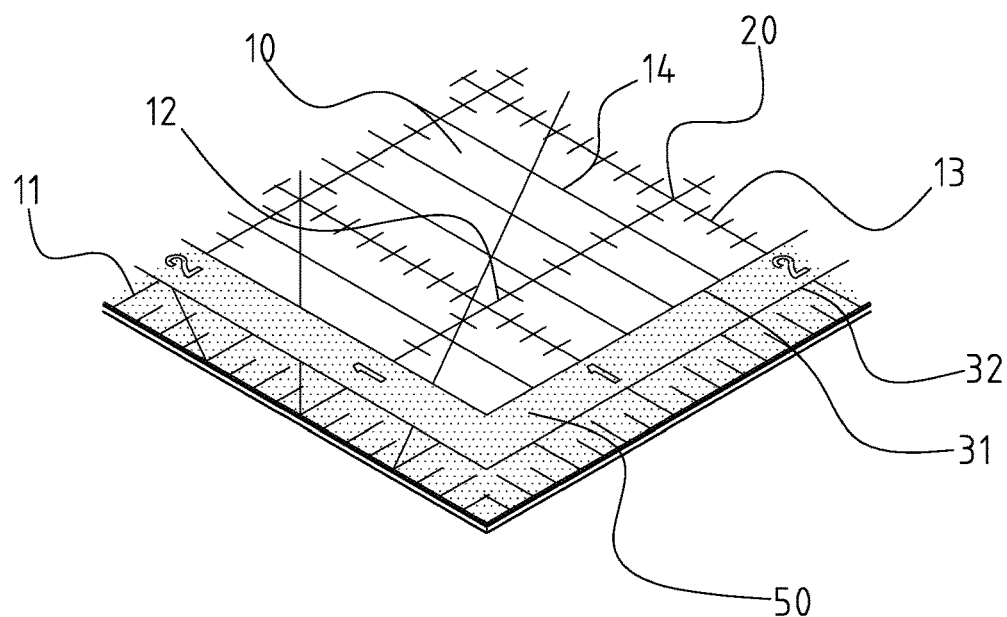
FIG. 3 is a partially enlarged perspective view of a tailor ruler in accordance with the present invention.

Referring to the drawings and initially to FIGS. 1, 2 and 3, a tailor ruler in accordance with the present invention comprises a transparent substrate 10 having a front surface and a back surface. The transparent substrate 10 includes a series of scales 11 peripherally formed on the front surface thereof, a series of parallel lines 12 formed on the front surface thereof and a series of longitudinal lines 13 formed on the front surface thereof, wherein the series of parallel lines 12 and the series of longitudinal lines 13 respectively perpendicularly correspond to one another. Each of the parallel lines 12 and the longitudinal lines 13 respectively has a series of reference lines 14 formed thereof. Each intersection of the parallel lines 12 and the longitudinal lines 13 is formed with an identifying point 20. An anti-slip layer 50 is disposed on the back surface of the transparent substrate 10, wherein the anti-slip layer 50 is disposed along an edge of the transparent substrate 10. The material of the anti-slip layer 50 is selected from a group consisted of thermoplastic polyurethane (TPU), rubber printing ink and silicone. The anti-slip layer 50 contains countless sharp particles 51, wherein the sharp particles 51 are partially exposed relative to a surface of the anti-slip layer 50 for promoting a fraction force of the anti-slip layer 50 and enhancing an anti-slip effect of the tailor ruler.

Figure 4:
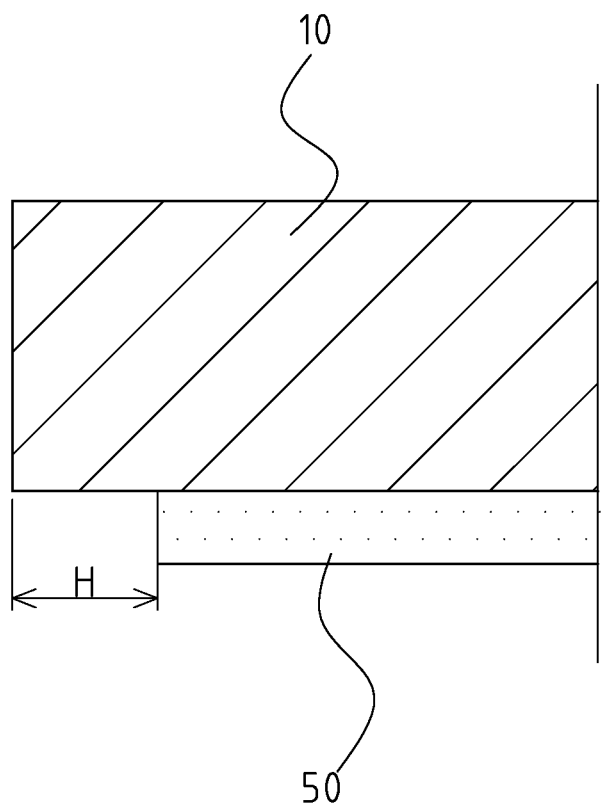
FIG. 4 is a partially cross-sectional view of a tailor ruler in accordance with the present invention.

In the preferred embodiment of the present invention, the sharp particles 51 has a property of high hardness and is selected from a group consisted of silicon-carbide and glass sand. With reference to FIG. 4, a distance H is formed between the edges of the anti-slip layer 50 and the transparent substrate 10. In the preferred embodiment of the present invention, the value of the distance H is 1 mm.

The color of the reference line 14 is different from that of the parallel line 12 and the longitudinal line 13 for featuring the comparison between the reference line 14 and the parallel/longitudinal line 12/13. The transparent substrate 10 has a seam allowance reference area 30 formed on the front surface thereof, wherein the seam allowance reference area 30 contains a full allowance reference line 31 and a semi allowance reference line 32.

The transparent substrate 10 further includes multiple angled lines 40 formed on the front surface thereof respectively along the angles of 30 degrees, 45 degrees and 60 degrees for the operator easily to mark the cutting line or draw an angled line on the cloth 80.

Each parallel line 12 and each longitudinal line 13 respectively has a series of separation scales 15 formed thereon, wherein each intersection of the separation scale 15 and the parallel lines 12/the longitudinal lines 13 is formed with a set point 151 for operator to easily divide a segment and measure a segment.

Figure 5:
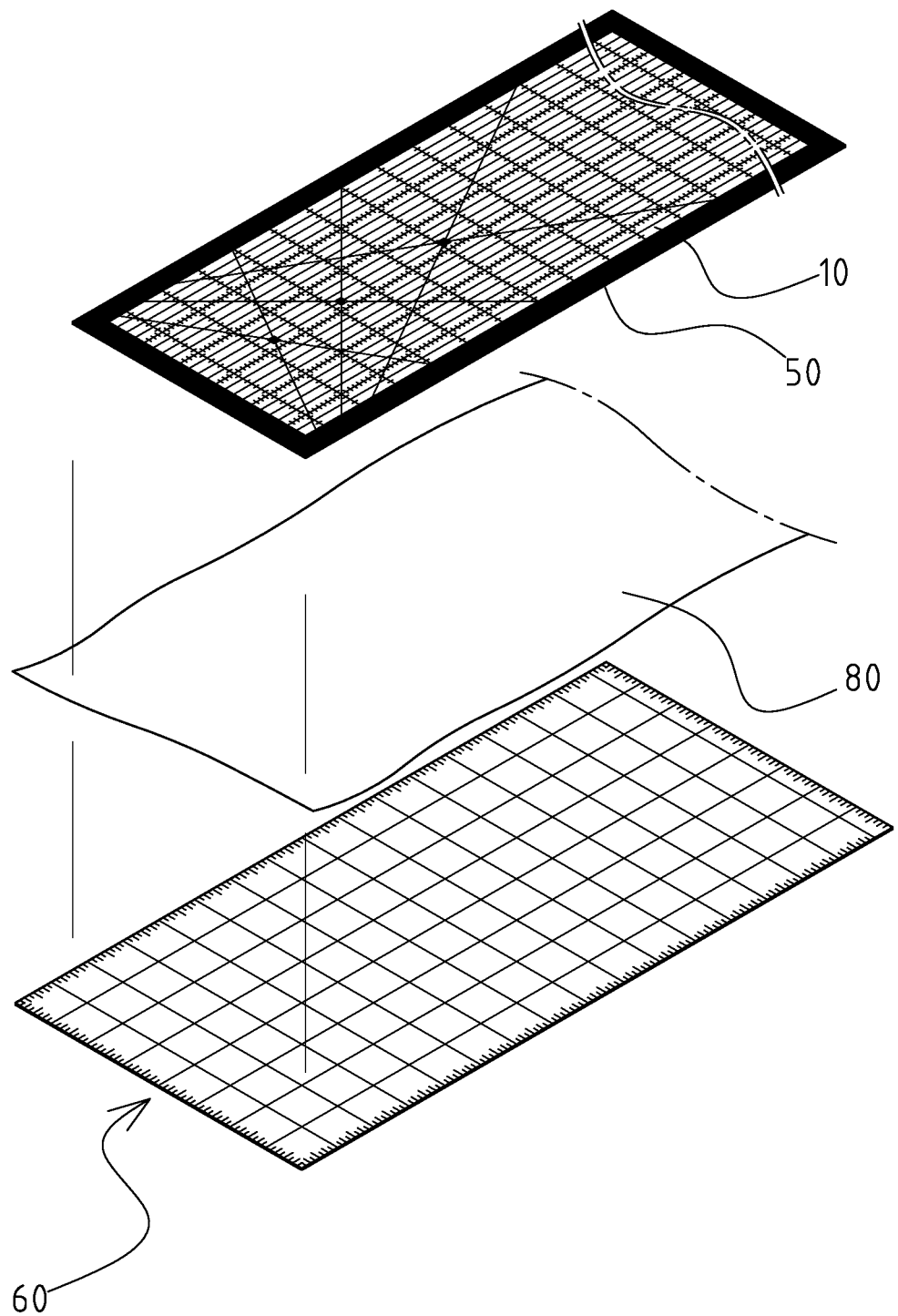
FIG. 5 is an exploded perspective view of a tailor cutting assembly in accordance with the present invention.
Figure 6:
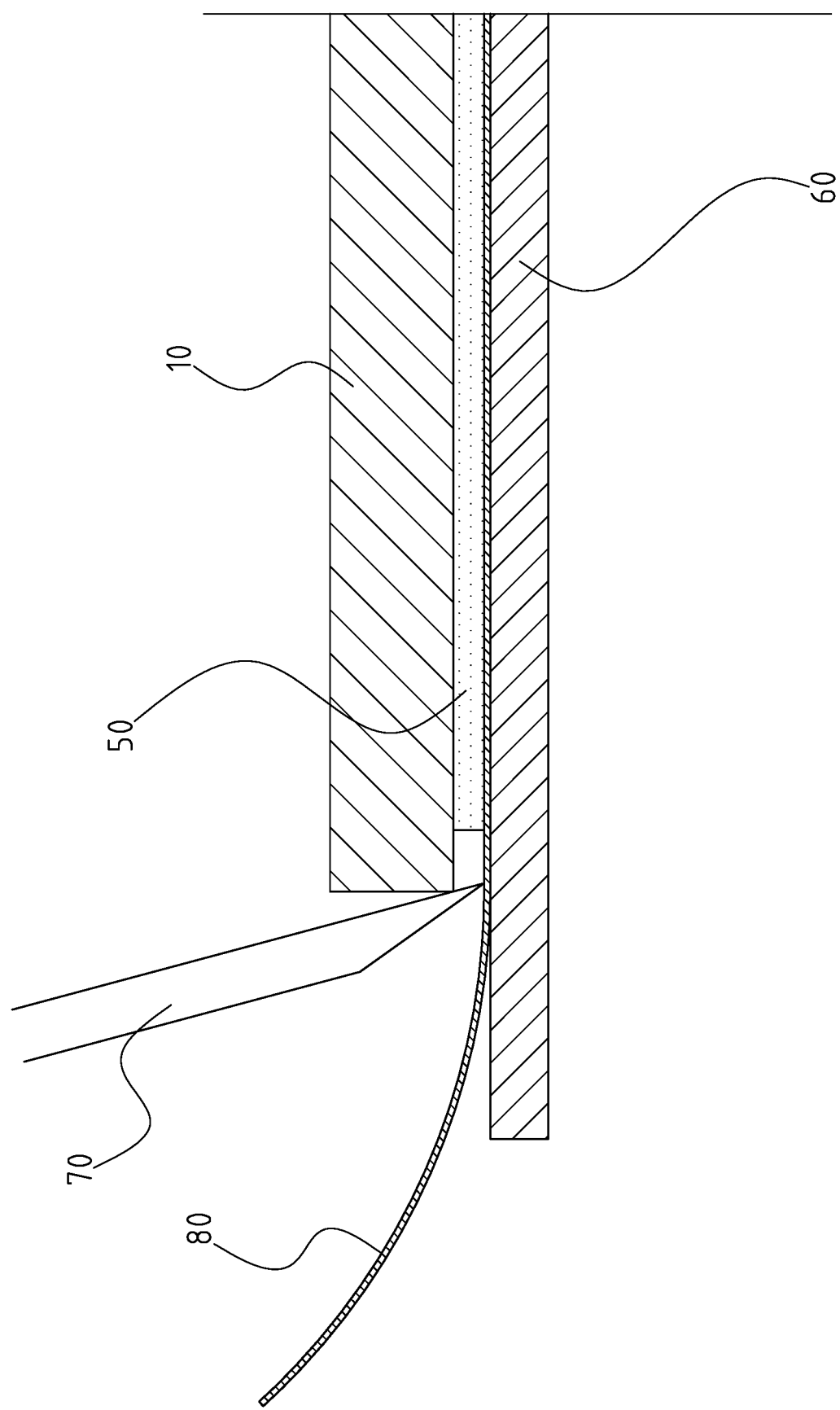
FIG. 6 is an operational view of the tailor cutting assembly in accordance with the present invention.

With reference to FIG. 5, the tailor ruler is coupled with an anti-slip mat cutting 60 for providing a doubled anti-slip effect when cutting the cloth 80 with a cutting tool 70. With reference to FIGS. 5 and 6, the cloth 80 is sandwiched between the anti-slip mat 90 and the tailor ruler, as described above. The sharp particles 51 contained in the anti-slip layer 50 are engaged to the cloth 80 for promoting the friction force between the tailor ruler and the cloth 80. Consequently, the cloth 80 is clamped between the tailor ruler and the anti-slip mat 60 for providing a doubled anti-slip effect the cloth 80 and precisely cutting the cloth 80. In addition, the distance H between the anti-slip layer 50 and the transparent substrate 10 makes the cutting tool 70 smoothly cutting the cloth 80, but does not reduces the anti-slip effect between the tailor ruler and the cloth such that the cutting effect is promoted.

Although the invention has been explained in relation to its preferred embodiment, it is to be understood that many other possible modifications and variations can be made without departing from the spirit and scope of the invention as hereinafter claimed.

I claim:

1. A tailor ruler comprising;
   a transparent substrate having a front surface and a back surface;
   a series of scales peripherally formed on the front surface of said transparent substrate;
   a series of parallel lines formed on the front surface of said transparent substrate;
   a series of longitudinal lines formed on the front surface of said transparent substrate, wherein said series of parallel lines and said series of longitudinal lines are in perpendicular relation, each of said series of parallel lines and each of said series of longitudinal lines having a series of reference lines formed thereon, each intersection of said series of parallel lines and said series of longitudinal lines having an identifying point; and
   an anti-slip layer disposed on the back surface of said transparent substrate, said anti-slip layer disposed as a continuous strip along each edge of said transparent substrate, said anti-slip layer being of a material selected from a group consisting of thermoplastic polyurethane, rubber printing ink and silicone, said anti-slip layer having sharp particles thereon, the sharp particles being partially exposed outwardly of said anti-slip layer.

2. The tailor ruler of claim 1, wherein the sharp particles are selected from a group consisting of silicon-carbide and glass sand.

3. The tailor ruler of claim 2, wherein a distance is formed between the edges of said anti-slip layer and said transparent substrate.

4. The tailor ruler of claim 3, wherein a color of the reference line is different from a color of said series of parallel lines and a color of said series of longitudinal lines, wherein said transparent substrate has a seam allowance reference area formed on the front surface thereof, wherein the seam allowance reference area has a full allowance reference line and a semi-allowance reference line.

5. The tailor ruler of claim 4, wherein said transparent substrate has multiple angled lines formed on the front surface thereof, the multiple angled lines extending at the angles of 30 degrees, 45 degrees and 60 degrees.

6. The tailor ruler of claim 5, wherein each of said series of parallel lines and each of said series of longitudinal lines respectively having a series of separation scales formed thereon, and each intersection of the separation scale and the parallel lines and the longitudinal lines is formed with a set point.

7. The tailor ruler of claim 1, wherein a distance is formed between the edges of said anti-slip layer and said transparent substrate.

8. The tailor ruler of claim 7, wherein a color of the reference line is different from a color of said series of parallel lines and a color of said series of longitudinal lines, wherein said transparent substrate has a seam allowance reference area formed on the front surface thereof, wherein the seam allowance reference area has a full allowance reference line and a semi-allowance reference line.

9. The tailor ruler of claim 8, wherein said transparent substrate has multiple angled lines formed on the front surface thereof, the multiple angled lines extending at the angles of 30 degrees, 45 degrees and 60 degrees.

10. The tailor ruler of claim 9, wherein each of said series of parallel lines and each of said series of longitudinal lines respectively having a series of separation scales formed thereon, and each intersection of the separation scale and the parallel lines and the longitudinal lines is formed with a set point.

11. A tailor cutting assembly comprising
    a tailor ruler comprising:
    a transparent substrate having a front surface and a back surface;
    a series of scales peripherally formed on the front surface of said transparent substrate;
    a series of parallel lines formed on the front surface of said transparent substrate;
    a series of longitudinal lines formed on the front surface of said transparent substrate, wherein said series of parallel lines and said series of longitudinal lines are in perpendicular relation, each of said series of parallel lines and each of said series of longitudinal lines having a series of reference lines formed thereon, each intersection of said series of parallel lines and said series of longitudinal lines having an identifying point; and an anti-slip layer disposed on the back surface of said transparent substrate, said anti-slip layer disposed as a continuous strip along each edge of said transparent substrate, said anti-slip layer being of a material selected from a group consisting of thermoplastic polyurethane, rubber printing ink and silicone, said anti-slip layer having sharp particles thereon, the sharp particles being partially exposed outwardly of said anti-slip layer; and an anti-slip mat coupled to said tailor ruler, said tailor ruler and said anti-slip mat adapted to clamp a cloth therebetween.

12. The tailor cutting assembly of claim 11, wherein the sharp particles are selected from a group consisting of silicon-carbide and glass sand.

13. The tailor ruler assembly of claim 12, wherein a distance is formed between the edges of the anti-slip layer and the transparent substrate.

14. The tailor ruler assembly of claim 13, wherein a color of the reference line is different from a color of said series of parallel lines and a color of said series of longitudinal lines, wherein said transparent substrate has a seam allowance reference area formed on the front surface thereof, wherein the seam allowance reference area has a full allowance reference line and a semi-allowance reference line.

15. The tailor ruler assembly of claim 14, wherein said transparent substrate has multiple angled lines formed on the front surface thereof, the multiple angled lines extending at the angles of 30 degrees, 45 degrees and 60 degrees.

16. The tailor ruler assembly of claim 15, wherein each parallel line and each longitudinal line respectively having a series of separation scales formed thereon, and each intersection of the separation scale and the parallel lines/the longitudinal lines is formed with a set point for operator to easily divide a segment and measure a segment.

17. The tailor cutting assembly of claim 11, wherein a distance is formed between the edges of said anti-slip layer and said transparent substrate.

18. The tailor ruler assembly of claim 17, wherein a color of the reference line is different from a color of said series of parallel lines and a color of said series of longitudinal lines, wherein said transparent substrate has a seam allowance reference area formed on the front surface thereof, wherein the seam allowance reference area has a full allowance reference line and a semi-allowance reference line.

19. The tailor ruler assembly of claim 18, wherein said transparent substrate has multiple angled lines formed on the front surface thereof, the multiple angled lines extending at the angles of 30 degrees, 45 degrees and 60 degrees.

20. The tailor ruler assembly of claim 19, wherein each parallel line and each longitudinal line respectively having a series of separation scales formed thereon, and each intersection of the separation scale and the parallel lines/the longitudinal lines is formed with a set point for operator to easily divide a segment and measure a segment.

* * * * *